(12) United States Patent
Goldenberg

(10) Patent No.: US 12,227,122 B2
(45) Date of Patent: Feb. 18, 2025

(54) FRONT CAP WITH INTEGRATED ILLUMINATION

(71) Applicant: Brinkley RV LLC, Goshen, IN (US)

(72) Inventor: Nathan Goldenberg, Granger, IN (US)

(73) Assignee: Brinkley RV LLC, Goshen, IN (US)

( * ) Notice: Subject to any disclaimer, the term of this patent is extended or adjusted under 35 U.S.C. 154(b) by 0 days.

(21) Appl. No.: 18/739,683

(22) Filed: Jun. 11, 2024

(65) Prior Publication Data

US 2024/0424977 A1  Dec. 26, 2024

Related U.S. Application Data

(60) Provisional application No. 63/522,320, filed on Jun. 21, 2023.

(51) Int. Cl.
*B60Q 1/04* (2006.01)
*F21S 41/20* (2018.01)

(52) U.S. Cl.
CPC .......... *B60Q 1/0408* (2013.01); *F21S 41/20* (2018.01); *B60Q 2800/00* (2022.05)

(58) Field of Classification Search
CPC ... B60Q 1/0408; B60Q 2800/00; F21S 41/20; F21S 41/2605; F21S 41/26241; F21S 41/265; F21S 41/27; F21S 41/50; F21S 41/51
See application file for complete search history.

(56) References Cited

U.S. PATENT DOCUMENTS

| | | | |
|---|---|---|---|
| 7,329,032 B2 | 2/2008 | Verwaerde et al. | |
| 7,922,374 B2 | 4/2011 | Schwab et al. | |
| 9,925,913 B2 | 3/2018 | Kudou et al. | |
| 11,518,327 B2 * | 12/2022 | Wymore | B60R 19/50 |
| 2014/0070569 A1 * | 3/2014 | Schmitz | B60J 10/20 |
| | | | 296/193.11 |
| 2016/0144900 A1 * | 5/2016 | Fortin | E02F 3/963 |
| | | | 296/193.1 |
| 2019/0143922 A1 * | 5/2019 | Chuptys | B60Q 1/26 |
| | | | 293/117 |

FOREIGN PATENT DOCUMENTS

| | | | | |
|---|---|---|---|---|
| CN | 111412431 A | * | 7/2020 | |
| DE | 102009005558 B4 | | 1/2013 | |
| EP | 3839328 A1 | * | 6/2021 | ............... B60Q 1/30 |
| WO | WO-9912768 A1 | * | 3/1999 | ........... B60Q 1/0408 |
| WO | WO-2015182637 A1 | * | 12/2015 | ........... B60Q 1/0035 |
| WO | WO-2021197869 A1 | * | 10/2021 | ....... B29C 45/14336 |

* cited by examiner

*Primary Examiner* — Zheng Song
(74) *Attorney, Agent, or Firm* — Sanders Pianowski LLP

(57) ABSTRACT

A recreational vehicle has a front cap with integrated accent illumination. The front cap has a finished outer surface that extends uninterrupted across lighting regions with surfaces having special relationships to each other. The accent illumination is created by the surfaces in the lighting region and a translucent diffuser that is secured and sealed around its perimeter to form an enclosed volume. The lighting region has a valley that holds a luminaire that is surrounded by an adhesive landing surface. The adhesive landing surface is located between a lighting landing surface and an outside perimeter surface.

20 Claims, 4 Drawing Sheets

FRONT CAP WITH INTEGRATED ILLUMINATION

CROSS REFERENCE TO RELATED APPLICATIONS

This application claims the benefit of Provisional Application Ser. No. 63/522,320, filed Jun. 21, 2023, the disclosure of which is incorporated by reference.

BACKGROUND OF THE INVENTION

The present disclosure relates to auxiliary/accent lighting for recreational vehicles, trailers, campers, and other mobile living quarters. These are frequently assembled from an array of off-the-shelf and custom designed components. Front caps and other body parts are no exception. While side walls, roofs, and floors are frequently made from off-the-shelf or standardized components, front caps and end caps are typically custom designed to properly mate to the walls, roof, and flooring of the camper, along with the inclusion of some aspects of style and design. For lighting, provisions in the front and end caps are minimal, with accent lighting being an afterthought and added after a hole is drilled and lighting is applied. These add possible leak paths into the camper and failure of the lighting by being directly exposed to the elements. Therefore, an improved design is needed.

SUMMARY OF THE INVENTION

The present disclosure describes a front cap for a towable fifth wheel or travel trailer having a front cap that includes built-in recesses for accent lighting that include a valley with a lighting landing surface at the bottom for lighting, angled walls that extend to a lens landing surface, and a surrounding surface that sits proud of the lens landing surface. Illumination is installed in the valley and adhered to the lighting landing surface while the power for the illumination is ran through an access hole to the interior of the recreational vehicle. A perimeter of adhesive (dispensed or continuous strip) is applied to the lens landing surface and a translucent lens is adhered to the perimeter of adhesive. The thickness of the translucent lens added to the perimeter of adhesive are equivalent to the amount of recess between the lens landing surface and the surrounding surface such that the outer surface of the translucent lens sits flush to the perimeter surface once fully assembled.

The invention consists of a towable recreational vehicle in combination with an illuminated front cap, the recreational vehicle has a roof and sidewalls joined to the front cap to form an enclosed living space. The front cap has a continuous finished outer surface overlaying and adhered to a structural layer. The finished outer surface extends to edges of said front cap and a portion of the front cap is an accent lighting region. The finished outer surface and structural layer extend uninterrupted through the accent lighting region. The accent lighting region is defined by an outside perimeter surface that surrounds and extends to an adhesive landing surface through an offsetting wall. The adhesive landing surface is recessed with respect to the outside perimeter surface. The adhesive landing surface surrounds and extends to a lighting landing surface. The lighting landing surface is located in a valley and recessed with respect to the adhesive landing surface. A translucent diffuser is affixed to the adhesive landing surface. The translucent diffuser has an outer surface and an opposite inner surface to define a thickness. The translucent diffuser also has a perimeter profile edge that extends between the inner and outer surfaces. The perimeter profile edge is complementary to the offsetting wall. The valley, lighting landing surface, and translucent diffuser form an enclosed cavity. A luminaire is affixed within the enclosed cavity.

DESCRIPTION OF THE PREFERRED EMBODIMENT

Figure 1:
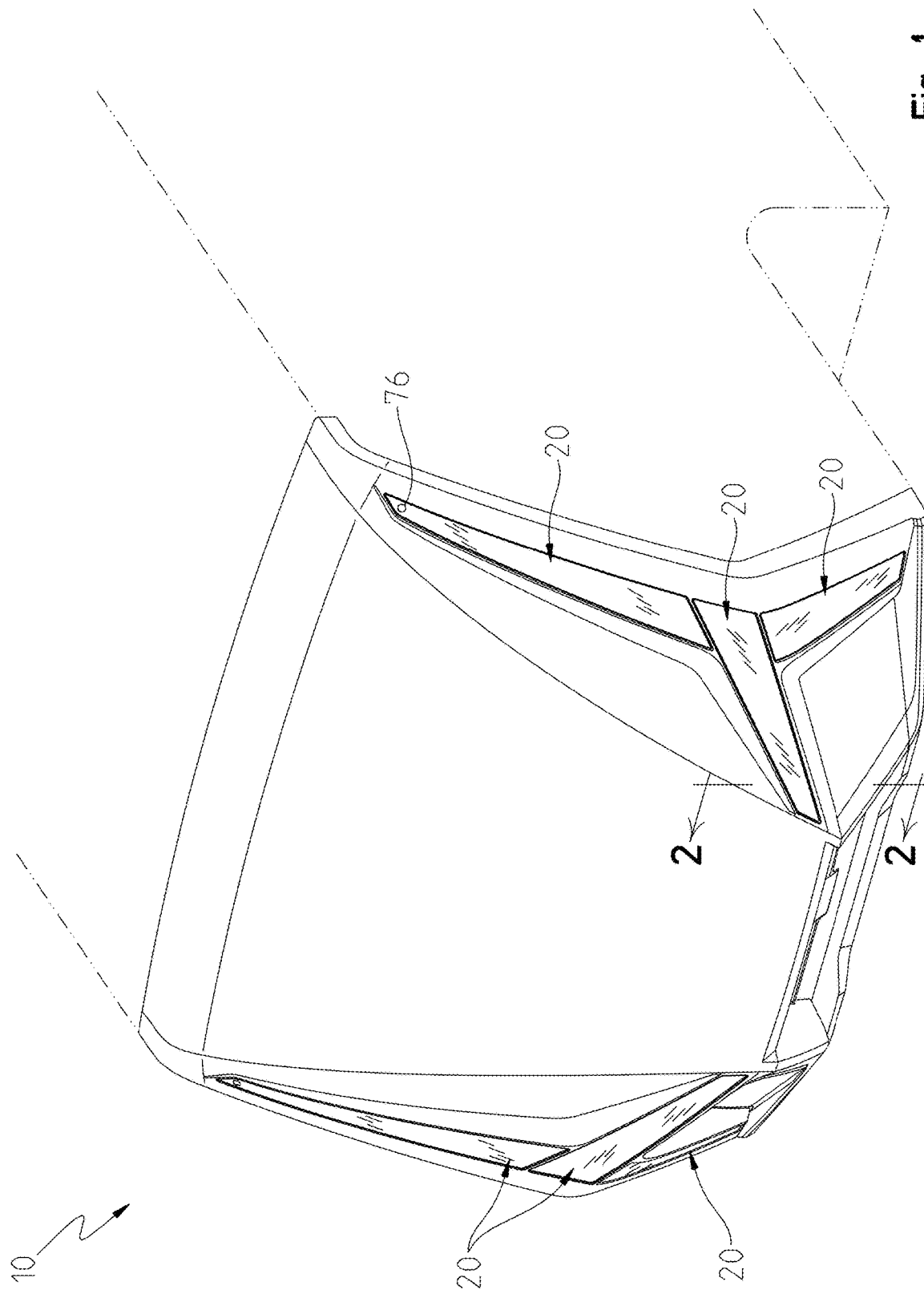
FIG. 1 is a front isometric view of an illuminated front cap as part of a towable recreational vehicle.
Figure 2:
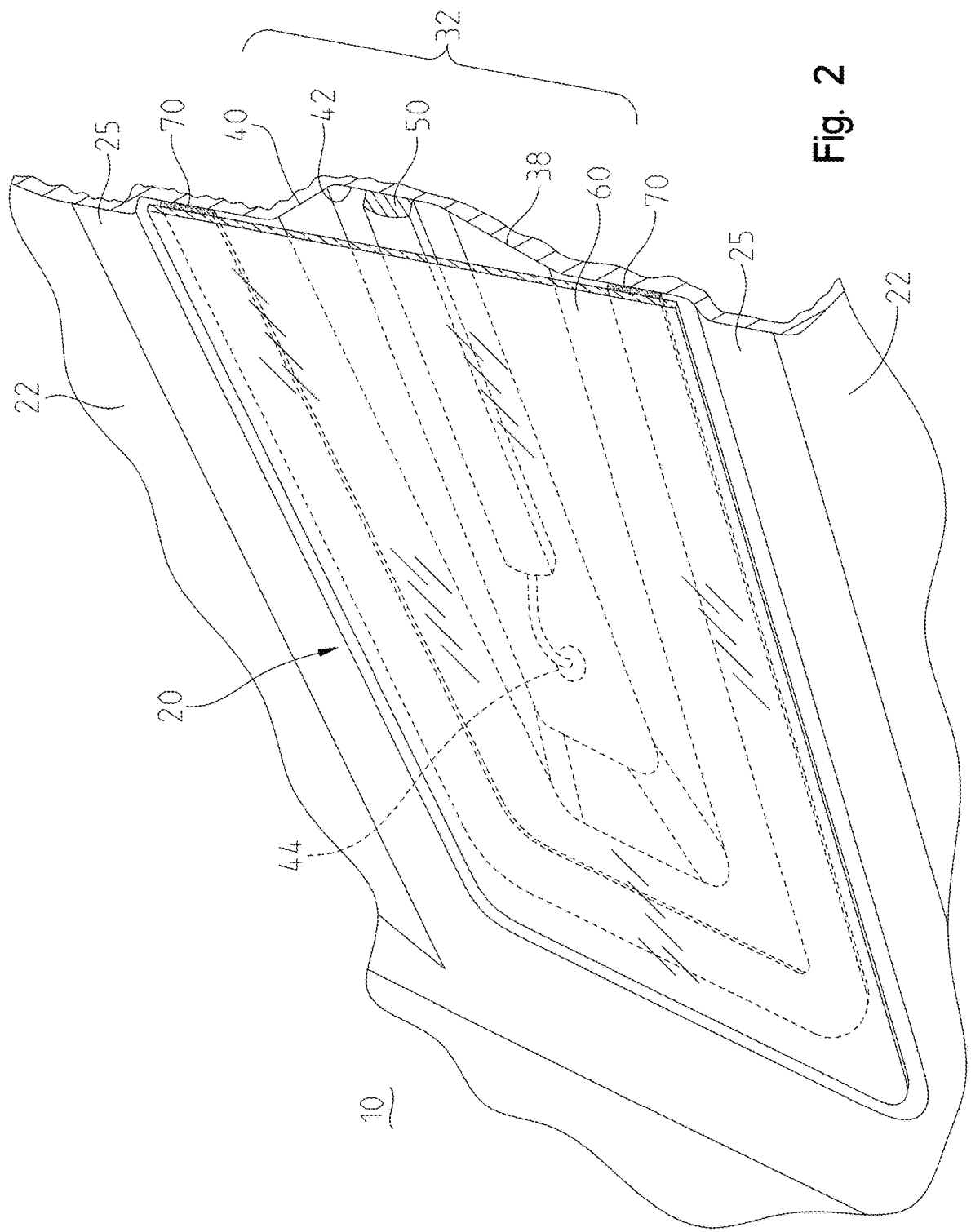
FIG. 2 is an isometric side section view 2-2 of the front cap in FIG. 1.

A front cap 10 is shown fully assembled in FIG. 1 with integrated recessed illumination areas 20. The front cap 10 has a contoured outside surface 22 and is attached to an RV, camper, trailer, or other recreational vehicle (not shown). The recreational vehicle has a roof, sidewalls, a rear wall, flooring, and front cap 10 to form an enclosed living area. The enclosed living area is protected from the outside elements. Depending on the type of recreational vehicle, the front cap 10 can extend across the entire front, extending from one side wall to the other and from the roof to the floor. The front cap 10 is commonly manufactured through a fiberglass process but can also be vacuum formed or molded. The outside surface 22 is a smooth finished surface that extends over the entire side and is covered with paint, gelcoat, decals, or a combination thereof. The outside surface 22 overlays and is securely adhered to a structural layer 23 with an inside surface 24 that is located opposite the outside surface 22. The inside surface 24 is typically unfinished because it is not seen by the end user. The front cap 10 is joined and sealed to side walls, the roof, and other surfaces, as is common for a recreational vehicle. While each illumination area 20 may appear different, they all have the same structural elements that are integrated into the front cap 10. Therefore, only one illumination area 20 will need to be described in detail.

The illumination area 20 is a region that is integrated into the front cap 10, formed only by the surface geometry in that area with the outside surface 22. In other words, the structure of the front cap 10 is the same in the illumination areas 20 as it is elsewhere. The surfaces and walls described for the illumination area 20 are regions formed by the geometry of the outside surface 22. An adhesive landing surface 30 is a continuous surface shown as having a consistent width that surrounds a lighting valley 32. The adhesive landing surface 30 is recessed from the outside surface 22 by a first or outer offsetting wall 34. The portion of the outside surface 22 that is directly adjacent to the first offsetting wall 34 is an outside perimeter surface 25. The adhesive landing surface 30 is offset from the outside perimeter surface 25 by a first distance 36. Because the outside surface 22 can be contoured, curved, or stylized, the outside perimeter surface 25 is parallel to the adhesive landing surface 30. The lighting valley 32 is recessed with respect to the adhesive landing surface 30 and formed from two opposing angled or contoured walls 38, 40 in a "V" or "U" shape that both meet a lighting landing surface 42. The lighting landing surface 42 is shown as having a consistent width but can be narrower or wider in some areas to accommodate other components or features. Further, the lighting landing surface 42 does not have to be parallel to either the outside surface 22 or adhesive landing surface 30. In any event, the adhesive landing surface 30 is located between the lighting landing surface 42 and the outside perimeter surface 25.

Adhered to the lighting landing surface 42 is a luminaire 50 (LED, fiber optic, incandescent, fluorescent, electroluminescent, or other source of illumination). The luminaire 50 may also have its own diffuser or lens, but it generally generates and directs light in a direction away from lighting landing surface 42. The luminaire 50 is powered through wires that run through a wiring access hole 44 in the lighting landing surface 42 or one of the angled walls 38, 40 in the lighting valley 32.

A diffuser 60 is formed from a transparent or translucent material and has a consistent thickness 68 with an outer surface 62 and inner surface 64. The diffuser 60 may be flexible enough to conform to any curvature of the adhesive landing surface 30. The diffuser 60 has a perimeter profile edge 66 that is complementary to the profile of the first offsetting wall 34. The perimeter profile edge 66 allows for enough clearance between the first offsetting wall 34 for the diffuser 60 to be adhered to the front cap 10 without excessive gaps or binding.

Figure 3:
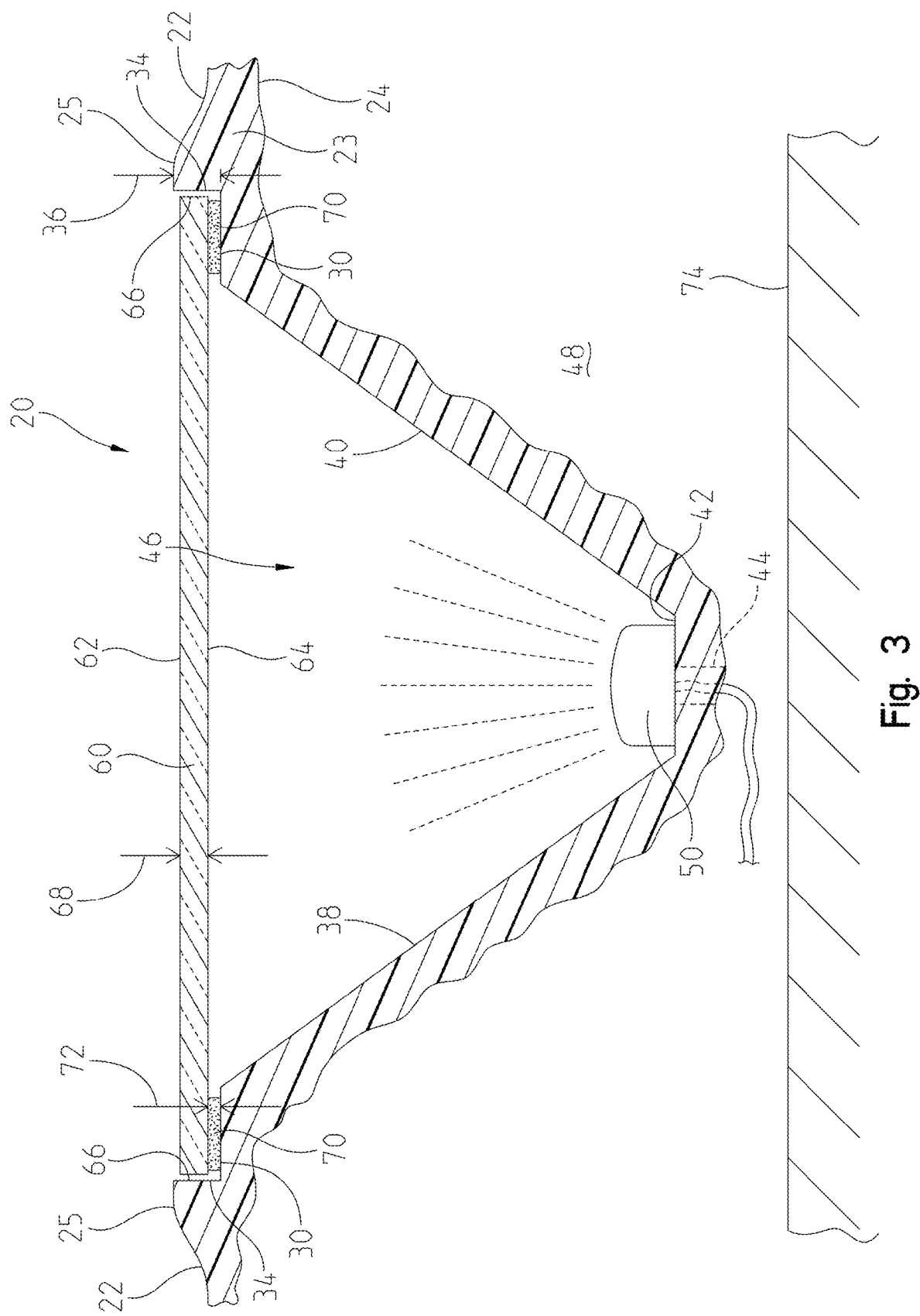
FIG. 3 is a side section view of a lighting region.

The diffuser 60 is secured to its respective illumination area 20 through adhesive 70, which could be dispensed adhesive, a precut adhesive strip or gasket, or other equivalent method that seals and bonds the diffuser 60 to the front cap 10. The adhesive 70 creates an uninterrupted seal around the entire adhesive landing surface 30 and inner surface 64 to prevent moisture or dirt intrusion into an enclosed cavity 46 created by the diffuser 60 and illumination area 20. The adhesive 70 has a thickness 72. As secured to the front cap 10, the diffuser 60, adhesive 70, and illumination area 20 form an integrated lighting enclosure or cavity that is sealed from the outside elements without clips, screws, rivets, or other fasteners. However, the enclosed cavity 46 may not be hermetically sealed. The wiring access hole 44 can allow air exchange between the enclosed cavity 46 and an unfinished area 48 between the inside surface 24 and the interior of the living space 74. The air exchange prevents a pressure differential between the enclosed cavity 46 and the outside environment that could cause failure of the adhesive 70 or distortion of the diffuser 60. As shown in FIG. 3, the thickness 68 of the diffuser 60 added to the thickness 72 of the adhesive is similar to (or the same as) the first distance 36. This puts the outer surface 62 in close alignment with the outside surface 22, providing a streamlined and smooth appearance to the front cap 10.

Figure 4:
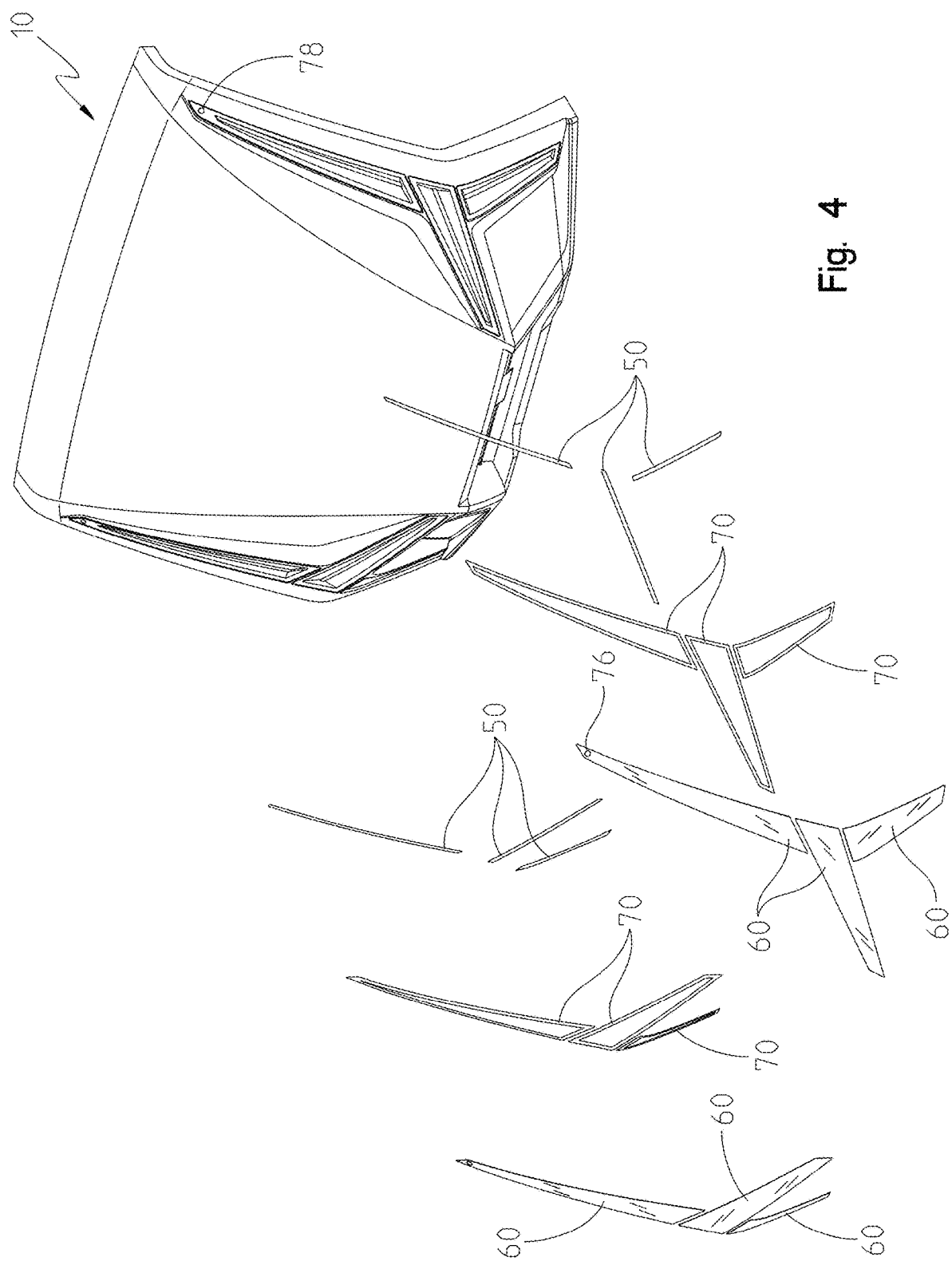
FIG. 4 is an exploded isometric view of the front cap in FIG. 1.

As seen in FIG. 4, the diffuser 60 may have a hole 76 for mounting a required safety, marker, or clearance light. In this area, the adhesive landing surface 30 and adhesive 70 may be wider to create a seal between the hole 76, a hole 78 in the cap, and the enclosed cavity 46. This is particularly important as the hole 76 could otherwise be a potential leak path into the enclosed cavity 46.

Because of its size and being subjected to the elements, wind forces, and road debris, the structural integrity of the front cap 10 is necessary for longevity. By their nature, the features and geometry that make up the illumination areas 20 could inherently weaken the front cap. Because of this, additional thickness of the substrate 23 or structure around the illumination areas 20 may be required to prevent unwanted distortion or warpage that could cause the diffuser 60 and/or adhesive 70 to fail.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A towable recreational vehicle in combination with an illuminated front cap, said recreational vehicle having a roof and sidewalls joined to said front cap to form an enclosed living space, said front cap comprising:
    a continuous finished outer surface overlaying and adhered to a structural layer, said finished outer surface extending to edges of said front cap, a portion of said front cap is an accent lighting region, said finished outer surface and said structural layer extending uninterrupted through said accent lighting region;
    said accent lighting region defined by an outside perimeter surface surrounding and extending to an adhesive landing surface through an offsetting wall, said adhesive landing surface is recessed with respect to said outside perimeter surface, said adhesive landing surface surrounding and extending to a lighting landing surface, said lighting landing surface is located in a valley and recessed with respect to said adhesive landing surface;
    a translucent diffuser affixed to said adhesive landing surface, said translucent diffuser having an outer surface and an inner surface to define a thickness, said translucent diffuser having a perimeter profile edge extending between said inner and outer surfaces, said perimeter profile edge is complementary to said offsetting wall;
    said valley, said lighting landing surface, and said translucent diffuser forming an enclosed cavity; and
    a luminaire affixed within said enclosed cavity.

2. The combination of claim 1, further comprising a continuous ring of adhesive material secured between said adhesive landing surface and said translucent diffuser.

3. The combination of claim 2, wherein said translucent diffuser and said ring of adhesive material having a combined thickness equal to or less than a distance between said adhesive landing surface and said outside perimeter surface.

4. The combination of claim 1, wherein said translucent diffuser is recessed with respect to said outside perimeter surface.

5. The combination of claim 1, wherein said valley is formed from a first angled wall and an oppositely located second angled wall.

6. The combination of claim 1, wherein said luminaire is affixed to said lighting landing surface.

7. The combination of claim 1, further comprising a wiring aperture in said enclosed cavity, said wiring aperture extending through said finished outer surface and said structural layer.

8. The combination of claim 1, further comprising an aperture extending through said diffuser and aligned with a second aperture in said structural layer, a marker light affixed therethrough.

9. A front cap for a towable recreational vehicle having integrated accent illumination, said front cap comprising:
    a continuous finished outer surface overlaying and adhered to a structural layer, a portion of said front cap is an accent lighting region, said finished outer surface and said structural layer extending uninterrupted through said accent lighting region;

said accent lighting region defined by an outside perimeter surface surrounding and extending to an adhesive landing surface through an offsetting wall, said adhesive landing surface is recessed with respect to said outside perimeter surface by a first distance, said adhesive landing surface surrounding and extending to a lighting landing surface, said lighting landing surface is located in a valley and recessed with respect to said adhesive landing surface;

a translucent diffuser having a perimeter profile edge complementary to said offsetting wall, said translucent diffuser is affixed to said adhesive landing surface adjacent said perimeter profile edge;

said valley, said lighting landing surface, and said translucent diffuser forming an enclosed cavity; and a luminaire affixed to said lighting landing surface.

10. The illuminated front cap of claim 9, further comprising a continuous ring of adhesive material secured between said adhesive landing surface and said translucent diffuser, said translucent diffuser and said ring of adhesive material having a combined thickness equal to or less than a distance between said adhesive landing surface and said outside perimeter surface.

11. The illuminated front cap of claim 9, wherein an outer surface of said translucent diffuser is spaced from said adhesive landing surface by a distance less than said first distance.

12. The illuminated front cap of claim 9, wherein said valley is formed from a first angled wall and an oppositely located second angled wall.

13. The illuminated front cap of claim 9, further comprising a wiring aperture in said enclosed cavity, said wiring aperture extending through said finished outer surface and said structural layer.

14. The illuminated front cap of claim 9, further comprising an aperture extending through said translucent diffuser and aligned with a second aperture in said accent lighting region, a marker light affixed therethrough.

15. A front cap for a towable recreational vehicle having integrated accent illumination, said front cap comprising:

a continuous finished outer surface overlaying and adhered to a structural layer, said finished outer surface extending to edges of said front cap, a portion of said front cap is an accent lighting region, said finished outer surface and said structural layer extending uninterrupted through said accent lighting region;

said accent lighting region defined by an outside perimeter surface surrounding and extending to an adhesive landing surface through an offsetting wall, said adhesive landing surface is recessed with respect to said outside perimeter surface, said adhesive landing surface surrounding and extending to a lighting landing surface, said lighting landing surface is located in a valley and recessed with respect to said adhesive landing surface;

a translucent diffuser affixed to said adhesive landing surface, said translucent diffuser having an outer surface and an inner surface to define a thickness, said translucent diffuser having a perimeter profile edge extending between said inner and outer surfaces, said perimeter profile edge is complementary to said offsetting wall;

said valley, said lighting landing surface, and said translucent diffuser forming an enclosed cavity;

a wiring aperture in said enclosed cavity, said wiring aperture extending through said finished outer surface and said structural layer; and a luminaire affixed within said enclosed cavity.

16. The illuminated front cap of claim 15, further comprising a continuous ring of adhesive material secured between said adhesive landing surface and said translucent diffuser, said ring of adhesive material having a combined thickness equal to or less than a distance between said adhesive landing surface and said outside perimeter surface.

17. The illuminated front cap of claim 15, wherein said translucent diffuser is recessed with respect to said outside perimeter surface.

18. The illuminated front cap of claim 15, wherein said valley is formed from a first angled wall and an oppositely located second angled wall.

19. The illuminated front cap of claim 15, wherein said luminaire is affixed to said lighting landing surface.

20. The illuminated front cap of claim 15, further comprising an aperture extending through said translucent diffuser and aligned with a second aperture in said adhesive landing surface, a marker light affixed therethrough.

* * * * *